3,121,096
NEW PROCESS OF PREPARATION OF
3-METHYL CHROMONE
Robert Joly, Montmorency, Julien Warnant, Neuilly-sur-Seine, and Bernard Goffinet, Paris, France, assignors to Roussel-UCLAF, S.A., Paris, France, a corporation of France
No Drawing. Filed Dec. 19, 1962, Ser. No. 245,675
Claims priority, application France Dec. 27, 1961
5 Claims. (Cl. 260—345.2)

This invention relates to a new process for the preparation of 3-methyl chromone, a compound used therapeutically as a coronary vasodilatator and corresponding to the formula

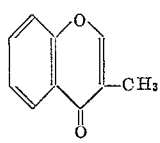

This product has been prepared until now either by action of ethyl formate on o-hydroxypropiophenone in the presence of sodium metal, or as has been shown in United States Patent 3,040,079 by using as a condensation agent the solution of an alkyl zinc halide in dimethylformamide.

According to Mentzer (Bull. Soc. Chim. 1955, 1083) the first of these processes presents industrial inconveniences because it requires the use of large amounts of sodium metal whose utilization involves a certain amount of danger. As far as the second process mentioned above, it does not utilize a commercial reactant and the duration of the reaction is relatively long.

It is, therefore, an object to provide a commercially applicable process for producing 3-methyl chromone using commercially available and safe reactants.

This and other objects of my invention will become apparent as description thereof proceeds.

We have now found that the condensation of methyl formate or another lower alkyl formate with o-hydroxypropiophenone is effected very easily in the presence of a solid alkali metal alcoholate, commercially available, and of a disubstituted amide of a lower alkanoic acid such as dimethylformamide or dimethylacetamide in the absence or presence of a third neutral solvent to produce 3-methyl chromone. The reaction progresses rapidly at low temperatures and necessitates no heating. For the execution of the process of the invention it is particularly advantageous to use the alkali alcoholate in excess, preferably at least double the stoichiometric amount.

According to a preferential mode of execution, there is utilized as the alkali alcoholate the commercial solid sodium methylate in the presence of dimethylformamide and adding to the suspension thus obtained first o-hydroxypropiophenone which passes thus into the enolic form, then methyl formate. The reaction is exothermic and goes to finish at ordinary room temperatures. The overall yield in pure product is in the neighborhood of 90%.

The following example illustrates the invention without, however, limiting it. We can particularly utilize dimethylacetamide in place of dimethylformamide and operate in the presence of an inert solvent such as benzene, toluene or petroleum ether without departing from the body of the invention or also use sodium ethylate in place of the methylate.

Example

Under a current of nitrogen and mechanical agitation while cooling exteriorly in an ice bath, 750 cc. of dimethylformamide was added to 216 gm. of dry sodium methylate. Then 250 gm. of o-hydroxypropiophenone were introduced over a period of 20 minutes in such a fashion that the temperature of the reaction mixture was maintained at about 20° C. The vapors of dimethylamine escape through the vertical condenser and the sodium methylate is dissolved almost integrally in proportion to the introduction of the o-hydroxypropiophenone at the same time that the reaction media turns from yellow to orange. After the introduction of the o-hydroxypropiophenone, the reaction mixture was maintained still another 15 minutes to 30 minutes at 20° C. and next it was cooled to —5° C. After cooling an abundant crystallization was noted and without interrupting the agitation or the current of nitrogen 250 cc. of methyl formate were introduced in such a fashion that the temperature did not go above —1° C. This required about ¾ hour. After the introduction was finished, the temperature was allowed to rise first to between 0° and 5° C. Then the refrigerating bath was removed. The mixture attained room temperature and was maintained at room temperature for 1 hour. Next the reaction mixture was acidified under exterior cooling by the addition of 500 cc. of acetic acid. Then the mixture was progressively heated to 100° C. under a vertical condenser in such a fashion as to allow the distillation of all vapors which pass below 100° C. The reaction mixture was then maintained at 100° C. under a vertical condenser for a period of 1 hour. Next the contents of the reaction flask were poured into a mixture of water and ice and the methyl chromone which crystallized in part was extracted with methylene chloride. The organic extracts were combined, washed with water until the wash waters were neutral and the wash waters were re-extracted with methylene chloride. The extracts coming from the wash waters were subjected to the same treatment as the preceding extract to which they were then combined. The extracts were dried over magnesium sulfate, filtered and passed through vegetable black. The filtrate was evaporated to dryness and furnished 267 gm. of raw methyl chromone, being a quantitative yield. After solution in boiling isopropyl ether and cooling, pure methyl chromone crystallized. After vacuum filtration and drying, a first lot of 230 gm. was obtained being a yield of 86% of the pure product having a melting point of 69.5° C., identical to the product described in the literature. By evaporation and recrystallization of the mother liquors, another 5% of the pure product was obtained.

While we have set forth certain specific embodiments and preferred modes of practice of our invention for illustration, it will be understood, that the invention is not limited thereto, and that various changes and modifications may be made in the invention without departing from the spirit of the disclosure or the scope of the appended claims.

We claim:
1. Process of preparation of 3-methyl chromone, which comprises condensing o-hydroxypropiophenone with a lower alkyl formate in the presence of a solid alkali metal alcoholate derived from a lower alkanol and a dimethyl substituted amide of a lower alkanoic acid.
2. Process according to claim 1 in which the solid alkali metal alcoholate is used in excess of the stoichiometric amount required.
3. Process according to claim 1 conducted in the presence of an inert organic solvent.
4. Process of preparation of 3-methyl chromone, which comprises condensing o-hydroxypropiophenone with methyl formamide in the presence of a compound selected from the group consisting of sodium methylate and sodium ethylate and a compound selected from the group consisting of dimethyl formamide and dimethyl acetamide.

5. Process of preparation of 3-methyl chromone, which comprises condensing o-hydroxypropiophenone with methyl formate in the presence of sodium methylate and dimethyl formamide.

References Cited in the file of this patent

UNITED STATES PATENTS

| 2,769,015 | Mentzer | Oct. 30, 1956 |
| 3,040,078 | Joly et al. | June 19, 1962 |
| 3,040,079 | Joly et al. | June 19, 1962 |

FOREIGN PATENTS

| 980,785 | France | Jan. 3, 1951 |